United States Patent
Padaki et al.

(10) Patent No.: US 10,813,146 B1
(45) Date of Patent: Oct. 20, 2020

(54) SYSTEM AND METHOD FOR ESTABLISHING A DEVICE TO DEVICE COMMUNICATION LINK IN CELLULAR NETWORKS

(71) Applicant: Saankhya Labs Pvt. Ltd., Bangalore (IN)

(72) Inventors: Gururaj Padaki, Bangalore (IN); Vishwakumara Kayargadde, Bangalore (IN); Rajendra V Hegde, Bangalore (IN); Anoop Hullenahalli, Bangalore (IN)

(73) Assignee: SAANKHYA LABS PVT. LTD., Bangalore, Karnataka (IN)

( * ) Notice: Subject to any disclaimer, the term of this patent is extended or adjusted under 35 U.S.C. 154(b) by 0 days.

(21) Appl. No.: 16/529,637

(22) Filed: Aug. 1, 2019

(30) Foreign Application Priority Data

Apr. 26, 2019 (IN) .............................. 201941016744

(51) Int. Cl.
*H04W 4/00* (2018.01)
*H04W 76/10* (2018.01)
*H04W 56/00* (2009.01)
*H04W 72/04* (2009.01)

(52) U.S. Cl.
CPC ......... *H04W 76/10* (2018.02); *H04W 56/001* (2013.01); *H04W 72/04* (2013.01)

(58) Field of Classification Search
CPC .... H04W 76/10; H04W 56/001; H04W 72/04
See application file for complete search history.

(56) References Cited

U.S. PATENT DOCUMENTS

| | | | |
|---|---|---|---|
| 2013/0170387 A1* | 7/2013 | Wang ...................... | H04W 4/70 370/252 |
| 2014/0192731 A1* | 7/2014 | Kim ...................... | H04W 88/08 370/329 |
| 2015/0078222 A1* | 3/2015 | Yang ...................... | H04L 5/0092 370/280 |

* cited by examiner

*Primary Examiner* — Siren Wei (57) ABSTRACT

Disclosed is a system and method for establishing a device to device communication link in cellular networks. The system includes one or more user equipments, and a base station. The one or more user equipments includes a first user equipment and a second user equipment. The first user equipment is configured with a first user equipment cognitive engine and the second user equipment is configured with a second user equipment engine. The base station that is coupled to a cellular tower and configured with an evolved packet core EPC. The base station and at least one of the one or more user equipments performs a method for establishing the device to device communication link in the cellular network using a transmit to receive transition gap (TTG) and a receive to transmit transition gap (RTG).

20 Claims, 12 Drawing Sheets

DEVICE TO DEVICE COMMUNICATION BANDWIDTH ALLOCATION – TYPICAL USAGE

FIG. 6A

OPTIMAL ALLOCATION OF DEVICE TO DEVICE COMMUNICATION CONSIDERING TTG, RTG

SYSTEM AND METHOD FOR ESTABLISHING A DEVICE TO DEVICE COMMUNICATION LINK IN CELLULAR NETWORKS

CROSS-REFERENCE TO RELATED APPLICATIONS

This application claims priority to Indian patent application no. 201941016744 filed on Apr. 26, 2019, the complete disclosure of which, in its entirely, is herein incorporated by reference.

BACKGROUND

Technical Field

The embodiments herein generally relate to cellular networks, and more particularly, to a system and method for establishing a device to device communication link in the cellular networks.

Description of the Related Art

Currently in cellular network deployment, a base station is configured once during deployment and most parameters related to random-access channel (RACH) are fixed during such configuration. Such fixed parameters might not be suitable for highly dense cellular networks resulting in RACH back offs which leads to huge cellular network entry delays. Delays in entering the cellular network are not acceptable in critical services.

Accordingly, there remains a need for a system and method for establishing a device to device communication link in cellular networks to enable faster network entry.

SUMMARY

In view of the foregoing, a system for establishing a device to device communication link in cellular networks using a transmit to receive transition gap (TTG) and a receive to transmit transition gap (RTG) of the cellular networks is provided. The system includes a base station, one or more user equipments, a memory and a storage device, and a processor. The base station is coupled to a cellular tower. The one or more user equipments includes a first user equipment and a second user equipment. The first user equipment is configured with a first user equipment cognitive engine and the second user equipment is configured with a second user equipment cognitive engine. In an embodiment, the processor in communication with the memory and the storage device, the processor executing machine readable program instructions for performing a method for establishing the device to device communication link in the cellular networks using the TTG (transmit to receive transition gap) and the RTG (receive to transmit transition gap). The method includes performing a time synchronization through at least one of (i) a downlink reference signal from the base station, (ii) a GPS (Global Positioning System) timing signal, or (iii) a timing reference signal from a digital television DTV, scheduling a downlink bandwidth for the first user equipment at the starting of a downlink transmission interval. The downlink transmission interval includes radio frames. The radio frames are divided into n sub frames of equal time interval based on a configuration of the cellular networks. The starting of the downlink transmission interval is a starting of a sub frame one and scheduling an uplink bandwidth for the first user equipment at an end of an uplink transmission interval to reduce the probability of overlapping signals at the TTG. The uplink transmission interval includes radio frames. The radio frames are divided into n sub frames of equal time interval based on a configuration of the cellular networks. The end of the uplink transmission interval is an end of a sub frame n. The one or more user equipments establishes the device to device communication link in a TTG timing interval or a RTG timing interval.

In some embodiments, the cellular networks includes a time division duplex TDD, a frequency division duplex FDD, and a cellular digital packet data (CDPD).

In some embodiments, the system includes a collaborative random-access channel (CRACH) method for low latency networks for joining the one or more user equipments in a dense urban and cellular IoT networks using the device to device communication link. In some embodiments, the collaborative random access channel (CRACH) method includes scanning by the second user equipment for the first user equipment connected with the base station when the base station is not available for the second user equipment, establishing the device to device communication link between the first user equipment and the second user equipment, allocating a bandwidth and announcing the bandwidth allocation in a downlink map from the base station to the second user equipment through the device to device communication link established between the first user equipment and the second user equipment, and enabling the second user equipment to enter into the dense urban and the cellular IoT networks on the CRACH request through the first user equipment to the base station.

In some embodiments, the collaborative random access channel (CRACH) method includes indicating a presence of second user equipment to the base station by the first user equipment through a message.

In some embodiments, the collaborative random access channel (CRACH) method also includes sending an information on a second user equipment presence to the base station by the first user equipment.

In some embodiments, the bandwidth allocation to the second user equipment is through a bypassing non-deterministic random access channel RACH process using a CRACH request.

In some embodiments, the system includes a method for increasing a number of active users served by the base station by establishing the device to device communication between the one or more user equipments. The method includes searching for the first user equipment presence which is connected to the base station; and establishing the device to device communication link with the first user equipment by the second user equipment on finding the first user equipment presence.

In some embodiments, the method includes sending a request message to the first user equipment by the second user equipment to act as a relay node to connect to the base station.

In some embodiments, the method includes approving the second user equipment request, sent via the first user equipment for allowing the second user equipment to communicate with the base station through the first user equipment and scanning for the base station downlink signal or synchronizing to a GPS signal or other timing reference signals when the second user equipment requests to join the dense urban and the cellular IoT networks.

In one aspect, a method for establishing a device to device communication link in cellular networks is provided. The method includes (a) performing a time synchronization through at least one of (i) a downlink reference signal from the base station, (ii) a GPS (Global Positioning System) timing signal, or (iii) a timing reference signal from a digital television DTV, (b) scheduling a downlink bandwidth for the first user equipment at a starting of a downlink transmission interval and second user equipment is outside of a coverage area from the base station, (c) scheduling an uplink bandwidth for the first user equipment later in a uplink transmission interval to reduce overlapping signals at the TTG and (d) establishing the device to device communication link in a TTG timing interval or a RTG timing interval by one or more user equipment. The coverage area is a geographical area in which the cellular networks offers a cellular service for the one or more user equipments.

In some embodiments, the cellular networks include a time division duplex TDD, a frequency division duplex FDD, and a cellular digital packet data (CDPD)

In some embodiments, the method includes a collaborative random access channel (CRACH) method for low latency networks joining the one or more user equipments in a dense urban and cellular IoT networks using the device to device communication link, the collaborative random access channel method including (i) scanning by the second user equipment for the first user equipment connected with the base station when the base station is not available for the second user equipment, (ii) establishing the device to device communication link between the first user equipment and the second user equipment, (iii) allocating a bandwidth and announcing the bandwidth allocation in a downlink map from the base station to the second user equipment through the device to device communication link established between the first user equipment and the second user equipment, and (iv) enabling the second user equipment to enter into the dense urban and the cellular IoT networks on the CRACH request through the first user equipment to the base station.

In some embodiments, the method includes indicating a presence of second user equipment to the base station by the first user equipment through a message.

In some embodiments, the method includes sending an information on a second user equipment presence to the base station by the first user equipment.

In some embodiments, the bandwidth allocation to the second user equipment is through a bypassing non-deterministic random access channel RACH process using a CRACH request.

In some embodiments, a method for increasing a number of active users served by the base station by establishing the device to device communication between the one or more user equipments is provided. The method includes (i) searching for the first user equipment presence which is connected to the base station; and (ii) establishing the device to device communication link with the first user equipment by the second user equipment on finding the first user equipment presence.

In some embodiments, the method includes sending a request message to the first user equipment by the second user equipment to act as a relay node to connect to the base station.

In some embodiments, the method includes approving the second user equipment request, sent via the first user equipment for allowing the second user equipment to communicate with the base station through the first user equipment and scanning for the base station downlink signal or synchronizing to a GPS signal or other timing reference signals when the second user equipment requests to join the dense urban and the cellular IoT networks.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a system and method for establishing a device to device communication link in cellular networks. The embodiments herein achieve this by configuring a cognitive engine on a User Equipment (UE) which gathers data from multiple sources for achieving an optimized power, an enhanced range random-access channel (RACH). Referring now to the drawings, and more particularly to FIGS. 1 through 12, where similar reference characters denote corresponding features consistently throughout the figures, there are shown preferred embodiments.

Figure 1:
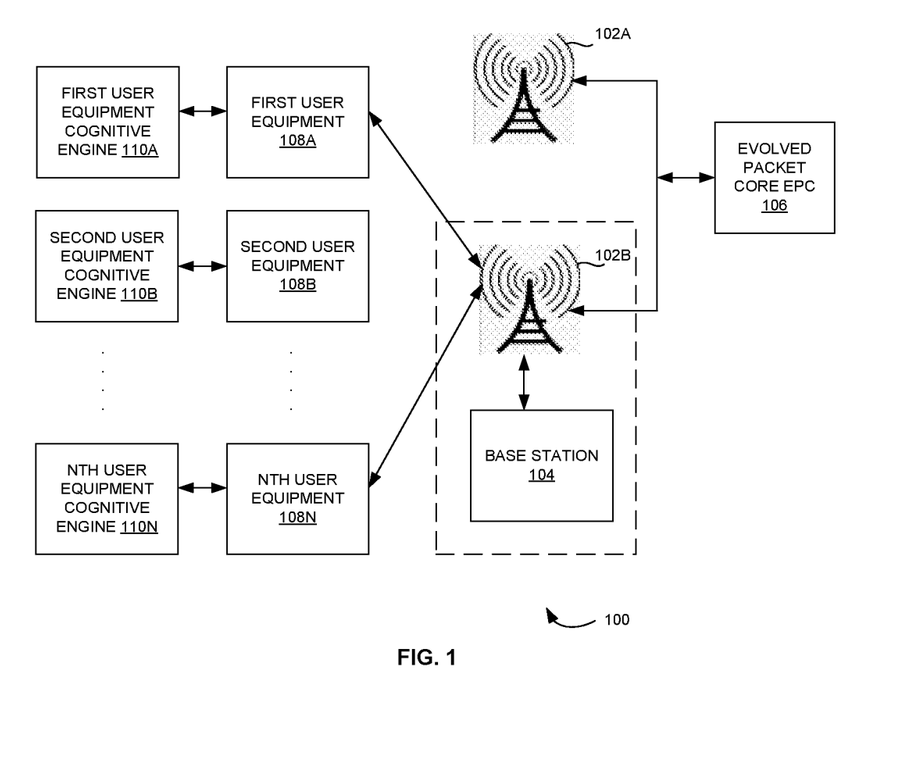
FIG. 1 is a block diagram that illustrates a system view of a cellular deployment including a base station according to some embodiments herein.

FIG. 1 is a block diagram 100 that illustrates a system of a cellular deployment including a base station 104 according to some embodiments herein. The block diagram 100 includes at least two cellular towers 102A-B, the base station 104 at a cellular tower 102A, an evolved packet core (EPC) 106, one or more user equipments (UEs) 108A-N and one or more first user cognitive engines 110A-N. In some embodiments, the EPC 106 is a framework for providing converged voice and data on the cellular networks. In some embodiments, a first user equipment 108A is configured with a first User Equipment (UE) cognitive engine 110A, a second user equipment 108B is configured with a second User Equipment (UE) cognitive engine 110B and an nth user equipment 108N is configured with an nth user equipment (UE) cognitive engine 110N. The base station 104 and the one or more first user equipments (UEs) cognitive engines 110A-N include a Random-Access Channel (RACH). In some embodiments, the RACH at the first user equipment 108A provides faster entry to the cellular networks which reduce consumption of a Radio Frequency (RF) power at the cellular tower 102B.

Figure 2:
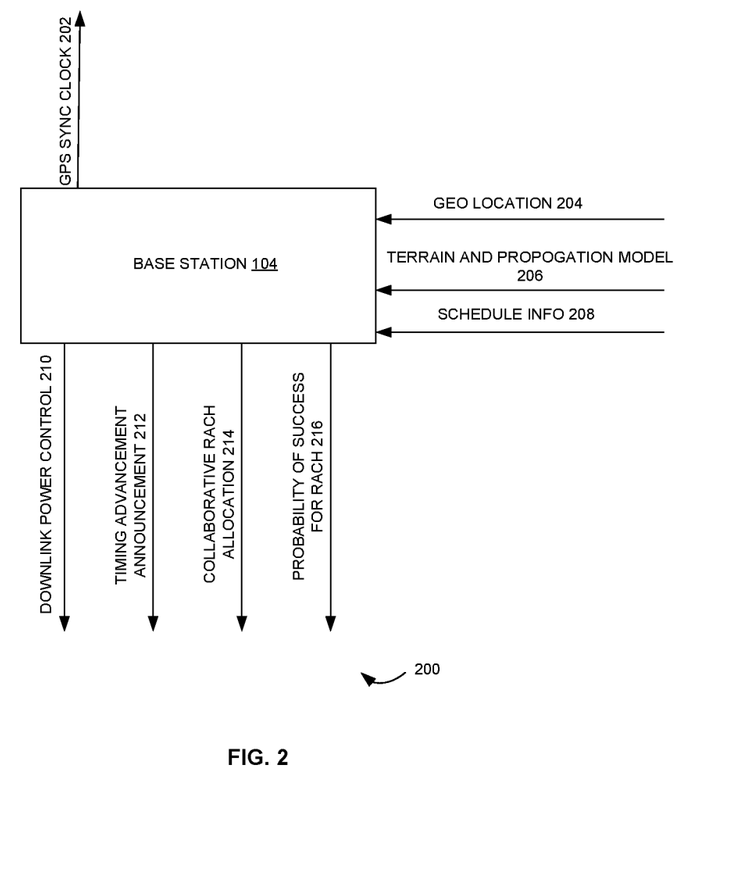
FIG. 2 is a block diagram that illustrates the base station with a Random-Access Channel (RACH) according to some embodiments herein.

FIG. 2 is a block diagram 200 that illustrates the base station 104 with a Random-Access Channel (RACH) according to some embodiments herein. The base station 104 includes one or more inputs and one or more outputs. The one or more inputs are (i) a Global Positioning System (GPS) sync clock 202, (ii) a geographic (GEO) location 204, (iii) a terrain and propagation model 206, and (iv) a schedule information 208. The one or more outputs are a downlink bandwidth and an uplink bandwidth. The GPS sync clock 202 provides geolocation and time information of the first user equipment 108A to a GPS receiver that is anywhere on earth or near the earth where there is an unobstructed line of sight to one or more GPS satellites. In some embodiments, the GEO location 204 is a process of finding, determining and providing an exact location of the first user equipment 108A. The GEO location 204 provides a location of the first user equipment 108A based on geographical coordinates and measurements.

The terrain and propagation model 206 is a characterization of radio wave propagation as a function of frequency, distance and other conditions. The terrain and propagation model 206 predicts path loss along with a communication link. The schedule information 208 for the base station 104 of the cellular tower 102B provides information on how the base station 104 allocates a downlink and an uplink to the one or more user equipments 108A-N.

The base station 104 provides proper convergence of the cellular networks based on advice or an estimation on the timing advancement announcement 212. The collaborative RACH allocation 214 indicates the base station 104 in the cellular tower 102B about edge nodes. In some embodiments, the edge nodes provide information on all the user equipment in a cellular network. In some embodiments, the edge nodes act as a relay node. The relay node may extend a coverage area of the cellular network. In some embodiments, the base station 104 marks the edge nodes as the relay node. The second user equipment 108B enters into the cellular network instead of directly entering to the base station 104, if the second user equipment 108B comes near to the first user equipment 108A. The base station 104 sends the probability of success 216 for the RACH, if the second user equipment 108B enters into the cellular network. In some embodiments, the probability of success 216 of the second user equipment 108B attaching to the base station 104 is calculated if the second user equipment 108B enters into the cellular network. In some embodiments, cellular networks include an uplink and a downlink. In some embodiments, the uplink and the downlink are divided into resource slots.

For example, consider a defined schedule (at 10 am daily) of data transmission from the second user equipment 108B to the base station 104. The second user equipment 108B may expect a downlink command from the base station 104. The downlink command may include resource information that includes at least one of (i) one or more information on a network load indicator, (ii) the schedule information 208, (iii) a distribution of the one or more user equipments 108A-N and (iv) how resources are allocated and encapsulated in a downlink map. For example, the downlink map includes an information of the one or more user equipments 108A-N such as the first user equipment 108A is allocated with 1 Megabits per second (Mbps) and the second user equipment 108B is allocated with 2 Mbps. The downlink map further includes the resource information which includes a number of resource slots in the second user equipment 108B and properties of the resource slots such as a MCS value coding, a modulation and code rate values such as a Quadrature Phase Shift Keying QPSK, a 64 quadrature amplitude modulation QAM or a 1/2 code rate.

Figure 3:
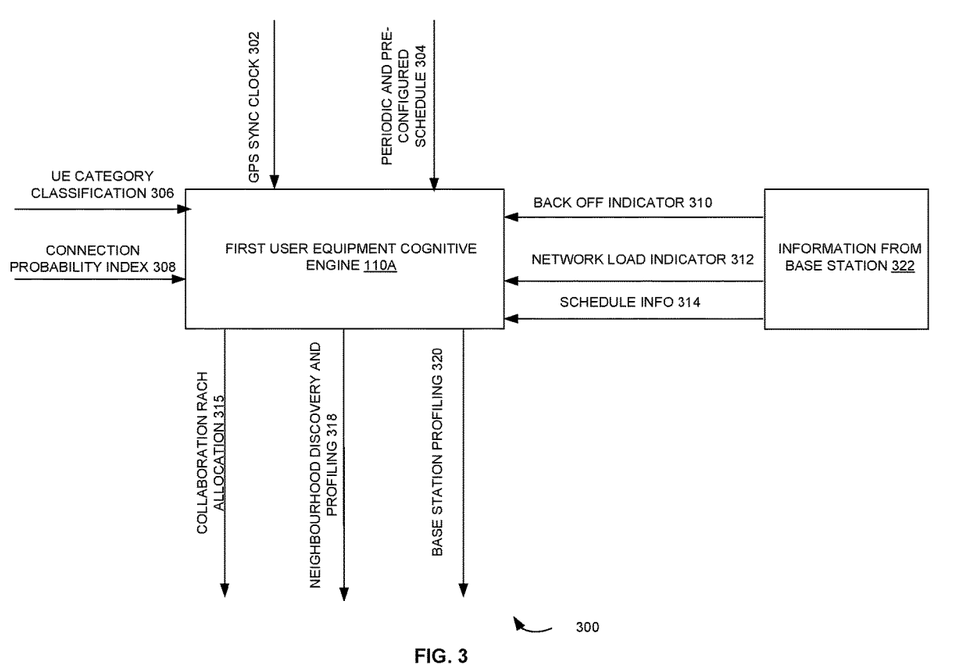
FIG. 3 is a block diagram that illustrates a User Equipment (UE) cognitive engine with the random-access channel according to some embodiments herein.

FIG. 3 is a block diagram 300 that illustrates the first user equipment cognitive engine 110A with a RACH according to some embodiments herein. The first user equipment cognitive engine 110A includes one or more inputs and one or more outputs. The one or more inputs includes at least one of (i) a global position system GPS sync clock 302, (ii) a periodic pre-configured schedule 304, (iii) a user equipment category classification 306, (iv) a connection probability index 308, (v) a back off indicator 310, (vi) network load indicator 312, and (vii) a schedule information 314. The GPS sync clock 302 provides geolocation and time information of the first user equipment (UE) 108A to a GPS receiver anywhere on or near the Earth where there is an unobstructed line of sight to four or more GPS satellites. The schedule information 314 provides information on how the base station 104 allocates a downlink and an uplink to the one or more user equipments 108A-N.

The one or more output includes at least one of (i) a collaborative RACH request 316, (ii) a neighboring discovery and profiling 318, and (iii) a base station profiling 320. The collaborative RACH request 316 requests the base station 104 to connect to the cellular network. The neighboring discovery and profiling 318 detect if the first user equipment 108A present in the cellular network which behaves as an edge node for connecting the second user equipment 108B to the base station 104. In some embodiments, the first user equipment 108A is a neighboring user equipment and the second user equipment is a new user equipment.

Figure 4:
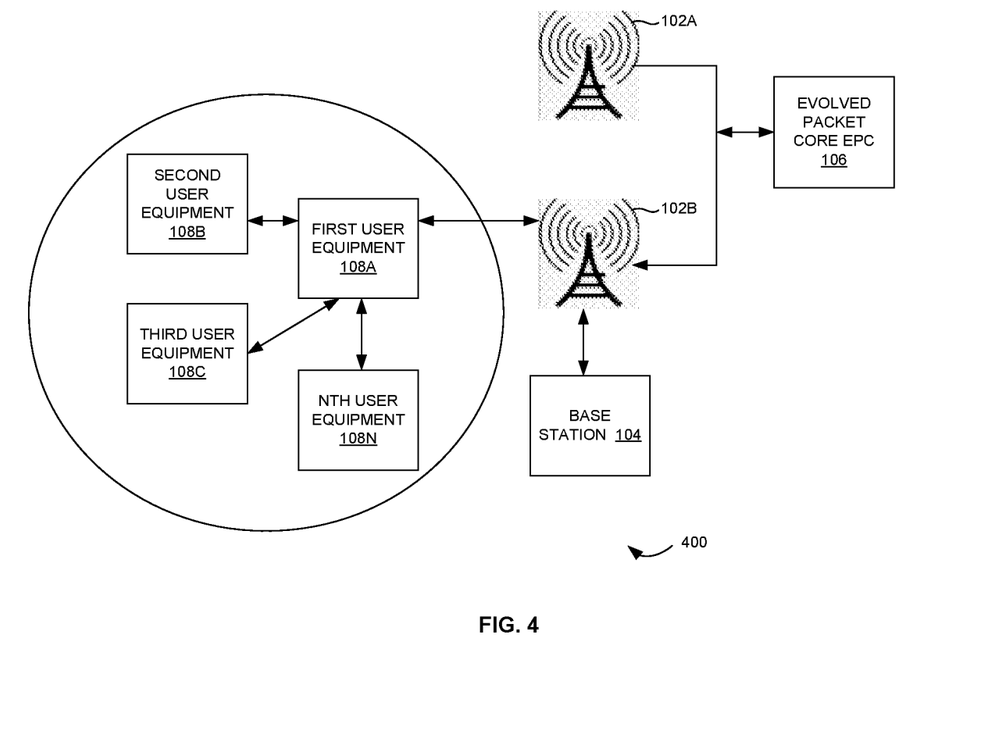
FIG. 4 is a block diagram that illustrates a collaborative random-access channel (CRACH) process for one or more user equipments (UEs) according to some embodiments herein.

FIG. 4 is a block diagram 400 that illustrates a collaborative random-access channel (CRACH) process for one or more user equipments 108A-N according to some embodiments herein. The CRACH process includes the first cellular tower 102A, the second cellular tower 102B, the first user equipment cognitive engine 110A, the evolved packet core EPC 106, the base station 104, and the one or more user equipments 108A-N.

Figure 5:
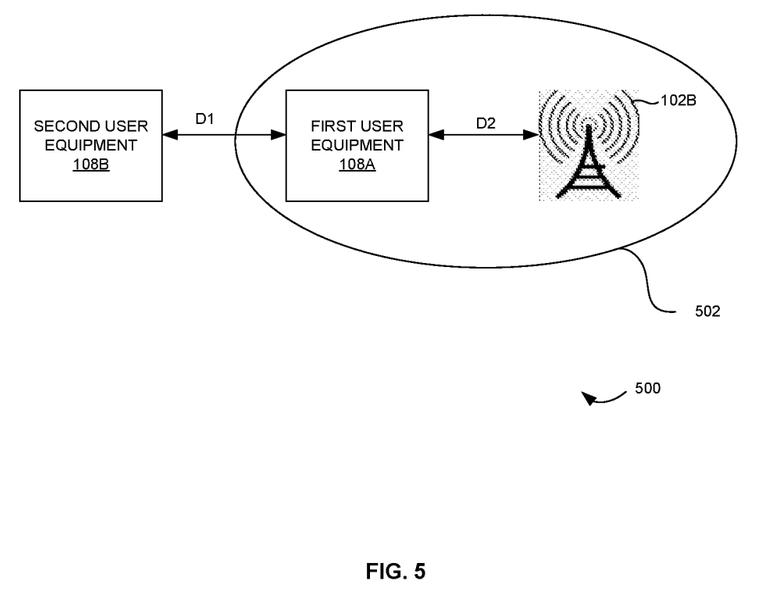
FIG. 5 is a block diagram that illustrates the collaborative random-access channel (CRACH) process according to some embodiments herein.

FIG. 5 is a block diagram 500 that illustrates the collaborative random-access channel (CRACH) process according to some embodiments herein. The CRACH process 500 includes the second user equipment 108B, the first user equipment 108A, the cellular tower 102B, and a cellular network coverage area 502. The base station 104 allocates resource slots at a cellular deployment of a device to device communication. A device to device communication bandwidth is optimally allocated such that it overlaps a Transmit Transition Gap (TTG) and a Receive Transition Gap (RTG). The schedule information 314 from the first user equipment cognitive engine 110A allocates a downlink and an uplink of the first user equipment 108A based on at least one of (i) a device to device communication link that is configured across entire network deployment, (ii) the second user equipment 108B synchronizes to the GPS sync clock 302 and (iii) timing advancement signals, e.g. digital television DTV sync. The second user equipment 108B searches for a base station downlink synchronization signal. The second user equipment 108B searches for the first user equipment 108A uplink signals on detection of the first user equipment 108A if the base station downlink synchronization signal is not detected by the second user equipment 108B. In some embodiments, the second user equipment 108B sends a collaborative RACH request to the first user equipment 108A using a device to device communication slot. In some embodiments, the first user equipment 108A acts as an edge node based on a downlink map. The collaborative RACH selects the first user equipment 108A (the user equipment UE cognitive engine 110A) based on announcements of the base station 104 in the downlink map and a probability of success index. The first user equipment 108A establishes the device to device (D2D) link with the second user equipment 108B. In some embodiments, the first user equipment 108A acts as a forwarding node. The first user equipment 108A indicates the base station 104 about the presence of the second user equipment 108B.

In some embodiments, the second user equipment 108B is inside the coverage area of the cellular network. The second user equipment 108B may establish the device to device communication with the first user equipment 108A. In some embodiments, the collaborative RACH process detects users at an edge. In some embodiments, the edge is D2 that is a distance. For example, in the collaborative RACH after detecting the second user equipment 108B, the base station 104 provides a command to the first user equipment 108A to act as an extender if the second user equipment 108B is not connected to the base station 104 or a bandwidth is not allocated to the second user equipment 108B by the base station 104. In some embodiments, the second user equipment 108B is not connected to the base station 104 due to network congestion. The bandwidth is not allocated to the second user equipment 108B by the base station 104 due to network congestion. In some embodiments, the second user equipment 108B is not connected to the base station 104 due to network coverage (for example the second user equipment 108B is outside of the cellular network). The second user equipment 108B detects the first user equipment 108A and the second user equipment 108B provides a command to the first user equipment 108A to act as a relay node so that the user joins the cellular network.

If the cellular network is fully loaded then the second user equipment 108B may be attached to the first user equipment 108A so that the probability of success (the base station includes an information on how the one or more user equipments trying to access the cellular network) index is calculated by the collaborative RACH. In some embodiments, if the probability of success is high, the second user equipment 108B gets attached to the cellular network. In some embodiments, if the probability of success is low, second user equipment 108B may not attach to the cellular network. The information on the probability of success is in the downlink map. In some embodiments, if the probability of success is low, first user equipment 108A may act as a relay instead of directly attaching to the cellular network through the base station 104.

Figure 6A:
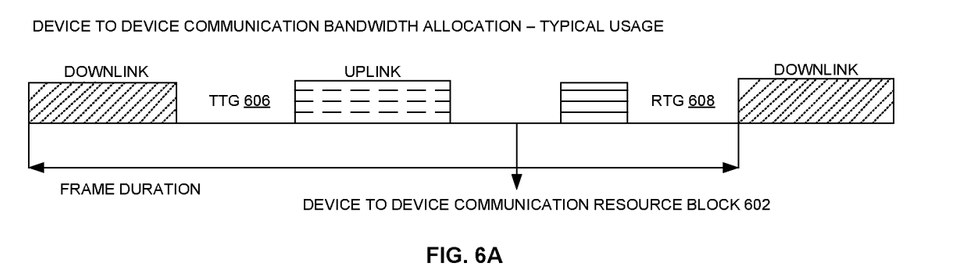
FIG. 6A is a timeline of a device to device bandwidth allocation without using the RACH according to some embodiments herein.

FIG. 6A is a timeline 600 of a device to device bandwidth allocation without using the collaborative RACH according to some embodiments herein. Typically, there is a gap between the uplink and the downlink. The first user equipment 108A receives data and responds directly when the first user equipment 108A sends the data in a downlink path. A Transmit Transition Gap (TTG) 606 and a Receive Transition Gap (RTG) 608 are determined during a time of the deployment of a cellular network based on an area the cellular network has to cover.

Figure 6B:
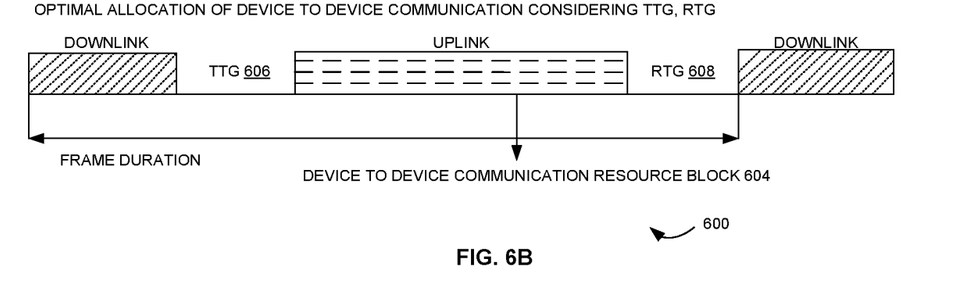
FIG. 6B is a timeline of a device to device bandwidth allocation using the RACH according to some embodiments herein.

FIG. 6B is a timeline of a device to device bandwidth allocation using the collaborative RACH according to some embodiments herein. If a hole in transmission time is a significant amount of time, the TTG 606 and the RTG 608 may be used for a device to device communication link. The TTG 606 and the RTG 608 may provide the device to device communication between the first user equipment 108A. In some embodiments, the first user equipment 108A is synchronized with a GPS DTV synchronization signal and the base station 104. In some embodiments, the first user equipment 108A is synchronized with the GPS if the second user equipment 108B comes inside the cellular network.

The second user equipment 108B searches at least one of an available downlink signal or the first user equipment 108A if the downlink signal is not detected and the second user equipment 108B is out of the coverage area. In some embodiments, the second user equipment 108B sends a collaborative RACH request to the first user equipment 108A through uplink if the second user equipment 108B searches for the first user equipment 108A. In some embodiments, the second user equipment 108B sends the collaborative RACH request through the TTG 606 and the RTG 608. In some embodiments, the first user equipment 108A attaches the second user equipment 108B to the base station 104 if the collaborative RACH request reaches the first user equipment 108A else the first user equipment 108A informs the base station 104 to increase power so that the second user equipment 108B comes inside the coverage area of the cellular network. If the first user equipment 108A is not inside the coverage area then the second user equipment 108B is unable to access the cellular network. For example, in a Long-Term Evolution (LTE) technology, there is a hole in time and during the hole, there is no transmission of a data but still, without involving the base station 104 the first user equipment 108A and the second user equipment 108B may communicate with each other using the device to device communication link.

Figure 7:
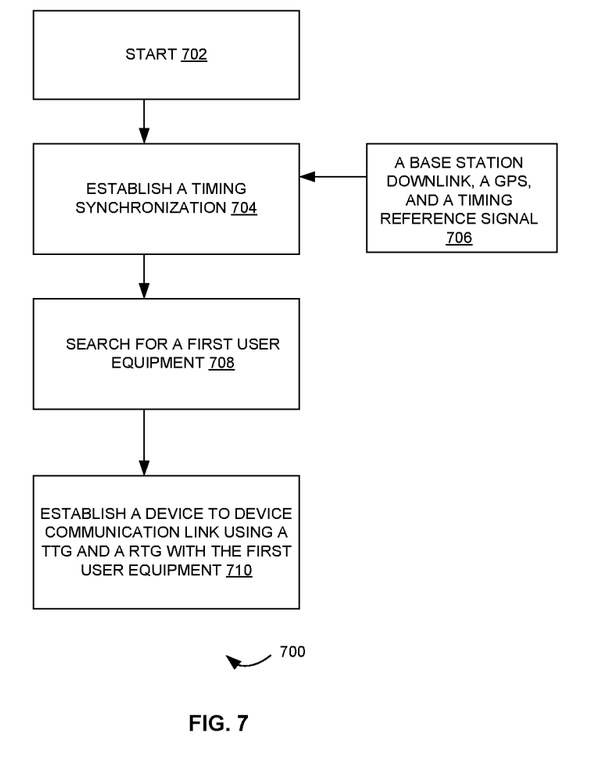
FIG. 7 is a flow diagram that illustrates a method for establishing the device to device communication link in a second user equipment (UE) according to some embodiments herein.

FIG. 7 is a flow diagram that illustrates a method 700 for establishing the device to device communication link in a second user equipment (UE) 108B according to some embodiments herein. At step 702, the method 700 includes starting, at the second user equipment 108B, a process of establishing the device to device communication link with the first user equipment 108A. At step 704, the method 700 includes establishing, at the second user equipment 108B a timing synchronization using a base station downlink, GPS, a timing reference signal such as DTV as mentioned in step 706. At step 708, the method 700 includes searching, at the second user equipment 108B, the first user equipment 108A. At step 710, the method 700 includes establishing, at the second user equipment UE 108B, the device to device communication link using the TTG 606 and the RTG 608 with the first user equipment 108A.

Figure 8:
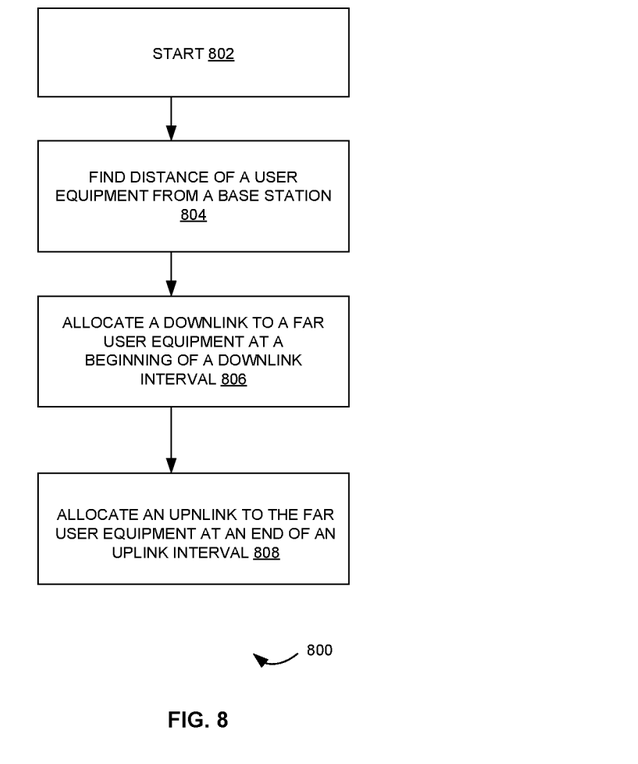
FIG. 8 is a flow diagram that illustrates a method for establishing the device to device communication link in a base station scheduler according to some embodiments herein.

FIG. 8 is a flow diagram that illustrates a method 800 for establishing the device to device communication link in a base station scheduler according to some embodiments herein. At step 802, the method 800 includes starting, at the base station scheduler, a process of establishing the device to device communication link with the second user equipment 108B. At step 804, the method 800 includes finding, the base station scheduler to find a distance of a user equipment from the base station 104. At step 806, the method 800 include allocating, by the base station scheduler, a downlink to a far user equipment at the beginning of the downlink transmission interval. The downlink transmission interval includes radio frames and the radio frames are divided into n sub frames of equal time interval based on a configuration of the cellular networks. The starting of the downlink transmission interval is a starting of a sub frame one. At step 808, the method 800 includes allocating, by the base station scheduler, an uplink to the far user equipment at the end of the uplink transmission interval. The uplink transmission interval includes radio frames. The radio frames are divided into n sub frames of equal time interval based on a configuration of the cellular networks. The end of the uplink transmission interval is an end of a sub frame n.

Figure 9:
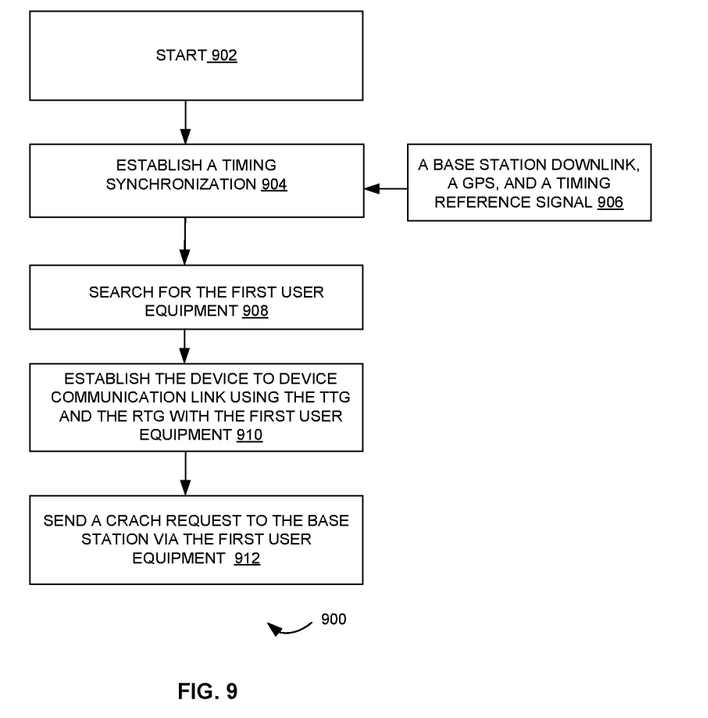
FIG. 9 is a flow diagram that illustrates a method for a CRACH in the second user equipment (UE) according to some embodiments herein.

FIG. 9 is a flow diagram that illustrates a method 900 for CRACH in the second user equipment (UE) 108B according to some embodiments herein. At step 902, the method 900 includes starting, at the second user equipment 108A, a process of establishing the device to device communication link with the first user equipment 108A. At step 904, the method 900 includes establishing, at the second user equipment 108B, a timing synchronization using the base station downlink, the GPS, the timing reference signal such as DTV as mentioned in step 906. At step 908, the method 900 includes searching, at the second user equipment 108B for the first user equipment 108A. At step 910, the method 900 includes establishing, at the second user equipment (UE) 108B, the device to device communication link using the TTG 606 and the RTG 608 with the first user equipment 108A. At step 912, the method 900 includes sending the CRACH request to the base station 104 via the first user equipment 108A.

Figure 10:
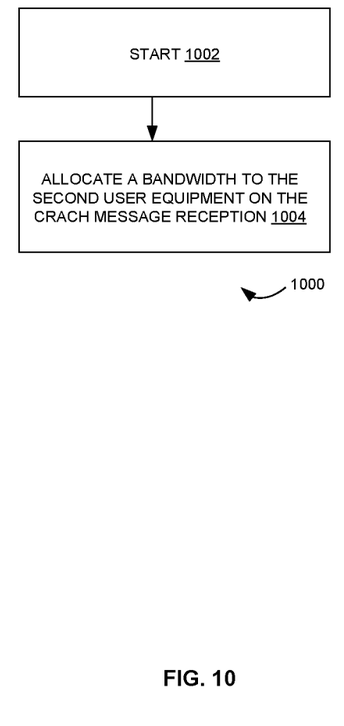
FIG. 10 is a flow diagram that illustrates a method for the CRACH in the base station scheduler according to some embodiments herein.

FIG. 10 is a flow diagram that illustrates a method 1000 for CRACH in the base station scheduler according to some embodiments herein. At step 1002, the method 1000 includes starting, at the base station scheduler, a process of establishing the device to device communication link with the first user equipment 108A by the second user equipment 108B. At step 1004, the method 1000 includes allocating, by the base station scheduler, a bandwidth for the second user equipment 108B on the reception of a CRACH message.

Figure 11:
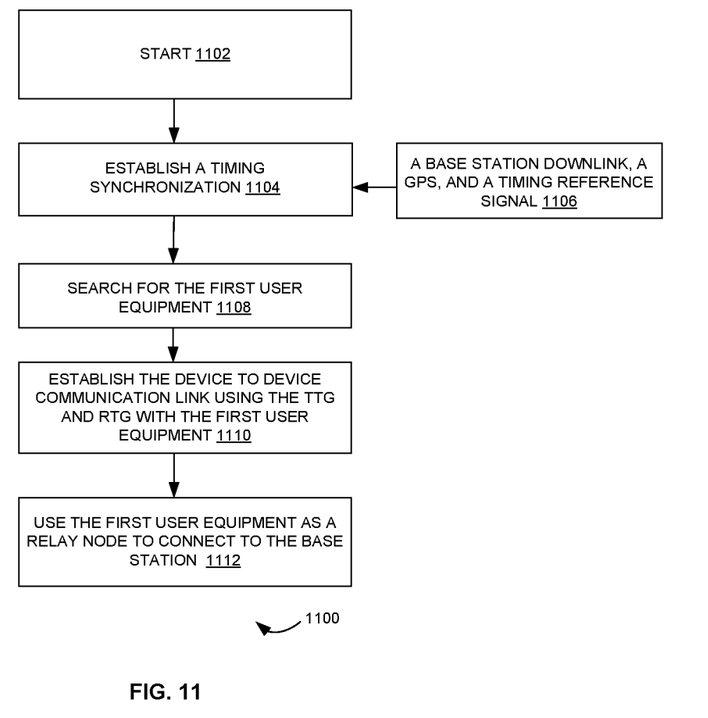
FIG. 11 is a flow diagram that illustrates a method for extending the base station coverage area without increasing a base station transmit power according to some embodiments herein.

FIG. 11 is a flow diagram that illustrates a method 1100 for extending base station coverage area without increasing base station transmit power according to some embodiments herein. At step 1102, the method 1100 includes starting, the second user equipment 108B to extend a base station coverage area without increasing the base station transmit power. At step 1104, the method 1100 includes establishing, at the second user equipment 108B, a timing synchronization using the base station downlink, the GPS, the timing reference signal such as DTV as mentioned in step 1106. At step 1108, the method 1100 includes searching, by the second user equipment 108B, the first user equipment 108A. At step 1110, the method 1100 includes establishing, at the second user equipment 108B, the device to device communication link using the TTG 606 and the RTG 608 with the first user equipment 108A. At step 1112, the method 1100 includes using the first user equipment 108A, as a relay node to connect the second user equipment 108B to the base station 104.

Figure 12:
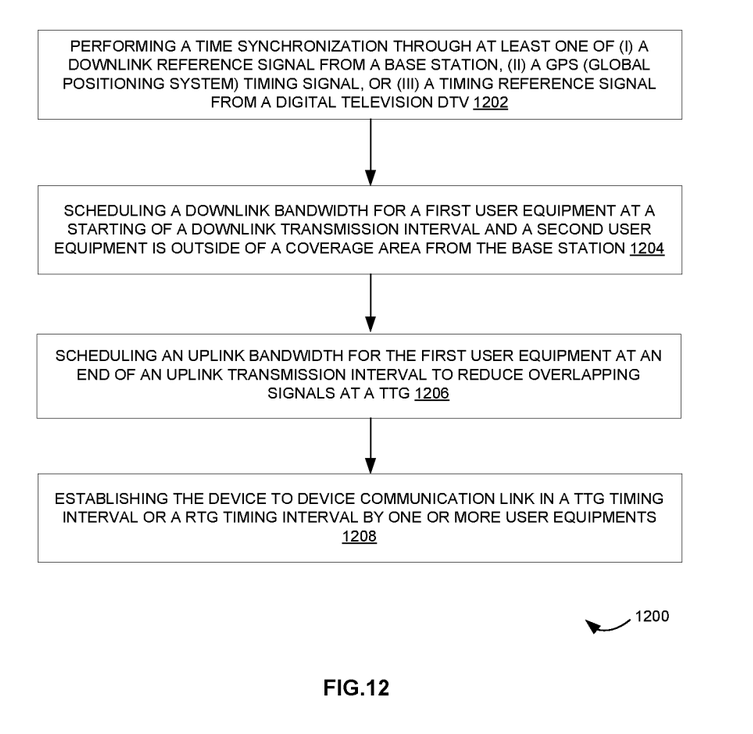
FIG. 12 is a flow diagram that illustrates a method for establishing a device to device communication link in a cellular network using a Transmit to receive transition gap (TTG) and a receive to transmit transition gap (RTG) according to some embodiments herein.

FIG. 12 is a flow diagram illustrating a method 1200 for establishing a device to device communication link in a cellular network using the TTG 606 and the RTG 608 according to some embodiments herein. At step 1202, the method 1200 includes, performing a time synchronization through at least one of (i) a downlink reference signal from the base station 104, (ii) a GPS (Global Positioning System) timing signal, or (iii) a timing reference signal from a digital television DTV. At step 1204, the method 1200 includes scheduling a downlink bandwidth for the first user equipment 108A at a starting of a downlink transmission interval and the second user equipment 108B is outside of a coverage area from the base station 104. The coverage area is a geographical area in which the cellular networks offers a cellular service for the one or more user equipments 108A-N. At step 1206, the method 1200 includes scheduling an uplink bandwidth for the first user equipment 108A at an end of an uplink transmission interval to reduce overlapping signals at the TTG 606. At step 1208, the method 1200 includes establishing the device to device communication link in a TTG timing interval or a RTG timing interval by one or more user equipments 108A-N.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for establishing a device to device communication link in cellular networks using a transmit to receive transition gap (TTG) and a receive to transmit transition gap (RTG) of the cellular networks, the system comprising:
    a base station that is coupled to a cellular tower;
    one or more user equipments comprising a first user equipment and a second user equipment, wherein the first user equipment is configured with a first user equipment cognitive engine and the second user equipment is configured with a second user equipment cognitive engine;

a memory and a storage device; and a processor in communication with the memory and the storage device, the communication processor executing machine readable program instructions for performing a method for establishing the device to device communication link in the cellular networks using the TTG and the RTG, the method comprising:

performing a time synchronization through at least one of (i) a downlink reference signal from the base station, (ii) a GPS (Global Positioning System) timing signal, or (iii) a timing reference signal from a digital television (DTV);

scheduling a downlink bandwidth for the first user equipment at a starting of a downlink transmission interval, wherein the downlink transmission interval comprises radio frames, wherein the radio frames are divided into n sub frames of equal time interval based on a configuration of the cellular networks and the starting of the downlink transmission interval is a starting of a sub frame one; and scheduling an uplink bandwidth for the first user equipment at an end of an uplink transmission interval to reduce a probability of overlapping signals at the TTG, wherein the one or more user equipments establishes the device to device communication link in a TTG timing interval or a RTG timing interval, wherein the uplink transmission interval comprises radio frames, wherein the radio frames are divided into n sub frames of equal time interval based on a configuration of the cellular networks and the end of the uplink transmission interval is an end of a sub frame n.

2. The system for establishing the device to device communication link in cellular networks of claim 1, wherein the cellular networks comprises a time division duplex TDD, a frequency division duplex (FDD), and a cellular digital packet data (CDPD).

3. The system for establishing the device to device communication link in cellular networks of claim 1, comprising a collaborative random access channel (CRACH) method to low latency networks for joining the one or more user equipments in a dense urban and cellular IoT networks using the device to device communication link, the collaborative random access channel (CRACH) method comprising:

scanning by the second user equipment for the first user equipment connected with the base station when the base station is not available for the second user equipment;

establishing the device to device communication link between the first user equipment and the second user equipment;

allocating a bandwidth and announcing the bandwidth allocation in a downlink map from the base station to the second user equipment through the device to device communication link established between the first user equipment and the second user equipment; and enabling the second user equipment to enter into the dense urban and the cellular IoT networks on the CRACH request through the first user equipment to the base station.

4. The system for establishing the device to device communication link in cellular networks of claim 3, wherein the method comprises indicating a presence of second user equipment to the base station by the first user equipment through a message.

5. The system for establishing the device to device communication link in cellular networks of claim 3, wherein the method comprises sending an information on a second user equipment presence to the base station by the first user equipment.

6. The system for establishing the device to device communication link in cellular networks of claim 3, wherein the bandwidth allocation to the second user equipment is through a bypassing non-deterministic random access channel (RACH) process using a CRACH request.

7. The system for establishing the device to device communication link in cellular networks of claim 1, comprising a method for increasing a number of active users served by the base station by establishing the device to device communication between the one or more user equipments, the method comprising:

searching for the first user equipment presence which is connected to the base station; and establishing the device to device communication link with the first user equipment by the second user equipment on finding the first user equipment presence.

8. The system for establishing the device to device communication link in cellular networks of claim 7, wherein the method comprises sending a request message to the first user equipment by the second user equipment to act as a relay node to connect to the base station.

9. The system for establishing the device to device communication link in cellular networks of claim 7, wherein the method comprises approving the second user equipment request, sent via the first user equipment for allowing the second user equipment to communicate with the base station through the first user equipment.

10. The system for establishing the device to device communication link in cellular networks of claim 7, wherein the method comprises scanning for the base station downlink signal or synchronizing to a GPS signal or other timing reference signals when the second user equipment requests to join the dense urban and the cellular IoT networks.

11. A method for establishing a device to device communication link in cellular networks using a transmit to receive transition gap (TTG) and a receive to transmit transition gap (RTG), the method comprising:

performing a time synchronization through at least one of (i) a downlink reference signal from a base station, (ii) a GPS (Global Positioning System) timing signal, or (iii) a timing reference signal from a digital television DTV;

scheduling a downlink bandwidth for a first user equipment at a starting of a downlink transmission interval and a second user equipment is outside of a coverage area from the base station, wherein the coverage area is a geographical area in which the cellular networks offers a cellular service for the one or more user equipments;

scheduling an uplink bandwidth for the first user equipment at an end of an uplink transmission interval to reduce overlapping signals at the TTG; and establishing the device to device communication link in a TTG timing interval or a RTG timing interval by one or more user equipments.

12. The method for establishing the device to device communication link in cellular networks of claim 11, wherein the cellular networks comprises a time division duplex (TDD), a frequency division duplex (FDD), and a cellular digital packet data (CDPD).

13. The method for establishing the device to device communication link in cellular networks of claim 11, further comprising a collaborative random access channel (CRACH) method for low latency networks joining the one or more user equipments in a dense urban and cellular IoT networks using the device to device communication link, the collaborative random access channel method comprising:
  scanning by the second user equipment for the first user equipment connected with the base station when the base station is not available for the second user equipment;
  establishing the device to device communication link between the first user equipment and the second user equipment;
  allocating a bandwidth and announcing the bandwidth allocation in a downlink map from the base station to the second user equipment through the device to device communication link established between the first user equipment and the second user equipment; and
  enabling the second user equipment to enter into the dense urban and the cellular IoT networks on the CRACH request through the first user equipment to the base station.

14. The method for establishing the device to device communication link in cellular networks of claim 13, further comprising indicating a presence of second user equipment to the base station by the first user equipment through a message.

15. The method for establishing the device to device communication link in cellular networks of claim 13, further comprising sending an information on a second user equipment presence to the base station by the first user equipment.

16. The method for establishing the device to device communication link in cellular networks of claim 13, wherein the bandwidth allocation to the second user equipment is through a bypassing non-deterministic random access channel RACH process using a CRACH request.

17. The method for establishing the device to device communication link in cellular networks of claim 11, further comprising extending the base station coverage area without increasing a base station transmit power by establishing the device to device communication between the one or more user equipments by:
  searching for the first user equipment presence which is connected to the base station if the second user equipment fails to detect downlink signal from the base station; and
  establishing the device to device communication link with the first user equipment by the second user equipment on finding the first user equipment presence.

18. The method for establishing the device to device communication link in cellular networks of claim 17, further comprising sending a request message to the first user equipment by the second user equipment to act as a relay node to connect to the base station.

19. The method for establishing the device to device communication link in cellular networks of claim 17, further comprising approving the second user equipment request, sent via the first user equipment for allowing the second user equipment to communicate with the base station through the first user equipment.

20. The method for establishing the device to device communication link in cellular networks of claim 17, further comprising scanning for the base station downlink signal or synchronizing to a GPS signal or other timing reference signals when the second user equipment requests to join the dense urban and the cellular IoT networks.

* * * * *